United States Patent
Liu et al.

(10) Patent No.: US 12,125,979 B2
(45) Date of Patent: Oct. 22, 2024

(54) LAYERED STRUCTURE FOR SOLID-STATE BATTERIES AND PROCESS OF FORMING THE SAME

(71) Applicant: THE REGENTS OF THE UNIVERSITY OF CALIFORNIA, Oakland, CA (US)

(72) Inventors: Ping Liu, San Diego, CA (US); Yejing Li, San Diego, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 523 days.

(21) Appl. No.: 17/437,778

(22) PCT Filed: Mar. 11, 2020

(86) PCT No.: PCT/US2020/022151
§ 371 (c)(1),
(2) Date: Sep. 9, 2021

(87) PCT Pub. No.: WO2020/185933
PCT Pub. Date: Sep. 17, 2020

(65) Prior Publication Data
US 2022/0158235 A1    May 19, 2022

(51) Int. Cl.
*H01M 10/0565*   (2010.01)
*H01M 4/134*   (2010.01)
(Continued)

(52) U.S. Cl.
CPC ....... *H01M 10/0565* (2013.01); *H01M 4/134* (2013.01); *H01M 10/0562* (2013.01); *H01M 50/414* (2021.01); *H01M 50/434* (2021.01); *H01M 50/449* (2021.01); *H01M 50/497* (2021.01); *H01M 2300/0071* (2013.01);
(Continued)

(58) Field of Classification Search
CPC ......... H01M 10/0562; H01M 10/0565; H01M 4/134; H01M 4/382; H01M 4/405; H01M 4/40; H01M 50/497; H01M 2300/0071; H01M 2300/0065; H01M 2300/0068; H01M 2300/0074; H01M 2300/0077;
(Continued)

(56) References Cited

U.S. PATENT DOCUMENTS

| 5,403,461 A | 4/1995 | Tuller et al. |
| 2014/0322603 A1 | 10/2014 | Holme et al. |

(Continued)

OTHER PUBLICATIONS

International Search Report and Written Opinion mailed Jun. 2, 2020 for International Application No. PCT/US2020/022151, filed Mar. 11, 2020.

*Primary Examiner* — Christopher P Domone
(74) *Attorney, Agent, or Firm* — Sheppard, Mullin, Richter & Hampton LLP (57) ABSTRACT

A solid-state battery and process of forming the same is provided. The solid-state battery includes a first metal electrode. The solid-state battery includes a first mixed conductor disposed on the first metal electrode. The first mixed conductor includes a mixture of ionic and electronic conductors. The solid-state battery includes a pure ionic conductor disposed on the first mixed conductor. The solid-state battery includes a second metal electrode disposed on top of the pure ionic conductor.

23 Claims, 8 Drawing Sheets (51) Int. Cl.
*H01M 10/0562* (2010.01)
*H01M 50/414* (2021.01)
*H01M 50/434* (2021.01)
*H01M 50/449* (2021.01)
*H01M 50/497* (2021.01)

(52) U.S. Cl.
CPC ............... *H01M 2300/008* (2013.01); *H01M 2300/0082* (2013.01); *H01M 2300/0094* (2013.01)

(58) Field of Classification Search
CPC ... H01M 2300/008; H01M 2300/0082; H01M 2300/0088; H01M 2300/0094
See application file for complete search history.

(56) References Cited

U.S. PATENT DOCUMENTS

| | | | |
|---|---|---|---|
| 2016/0233510 A1* | 8/2016 | Onodera | H01M 10/05 |
| 2017/0062799 A1* | 3/2017 | Song | H01M 4/8878 |
| 2020/0185780 A1* | 6/2020 | Herle | H01M 10/0562 |
| 2020/0235420 A1* | 7/2020 | Yushin | H01M 10/0565 |

* cited by examiner

LAYERED STRUCTURE FOR SOLID-STATE BATTERIES AND PROCESS OF FORMING THE SAME

GOVERNMENT LICENSE RIGHTS

This invention was made with government support under DE-AR0000781 awarded by the Department of Energy. The government has certain rights in the invention.

CROSS-REFERENCE TO RELATED APPLICATIONS

This present application is a U.S. national phase of PCT International Patent Application No. PCT/US2020/022151, filed Mar. 11, 2020 and titled "LAYERED STRUCTURE FOR SOLID-STATE BATTERIES AND PROCESS OF FORMING THE SAME," which claims priority to U.S. Provisional Patent Application No. 62/816,790, filed with the U.S. Patent and Trademark Office on Mar. 11, 2019 and titled "LAYERED STRUCTURE FOR SOLID-STATE BATTERIES AND PROCESS OF FORMING THE SAME," the contents of which are incorporated herein in their entirety.

TECHNICAL FIELD

The present disclosure is generally related to solid-state batteries. In particular, embodiments of the present disclosure relate to layered structures for solid-state metal batteries and process of forming the same.

BACKGROUND

Solid-state batteries are desirable over existing commercial batteries due to their improved safety and current densities. Existing technologies may provide direct contact between a solid electrolyte and the electrode which may create unwanted chemical side reactions. Existing technologies may create cell shorts due to metal depositions over time.

BRIEF SUMMARY OF EMBODIMENTS

Disclosed are devices, batteries, layered structures for solid-state batteries, and methods of forming the same. For example, a sandwiched ionic-mixed-electronic heterostructure may be disclosed that combines at least three distinctive conductive layers. With the heterostructure in solid-state metal batteries, (1) the direct contact between the ionic conductor (solid electrolyte) and electronic conductor (electrode) is avoided as well as their (electro)chemical side reaction; (2) the interfacial resistance is significantly reduced; (3) the metal deposition prefers to electrochemically grow between the mixed conductor and electronic conductor, preventing the cell short and increasing the safety; and (4) the solid-state metal battery can be operated at a high current density, as high as about 10 mA/cm2.

In one example, a solid-state battery may include a first metal electrode. The solid-state battery may also include a first mixed conductor disposed on the metal electrode. The first mixed conductor may include a mixture of ionic and electronic conductors. The solid-state battery may include a pure ionic conductor disposed on the first mixed conductor. The solid-state battery may also include a second metal electrode disposed on top of the pure ionic conductor.

In embodiments, the solid-state battery may further include a second mixed conductor disposed between the pure ionic conductor and the second metal electrode. The second mixed conductor may include the mixture of ionic and electronic conductors.

In embodiments, the first metal electrode may include one or more of Li, a metallic foil, and a metallic powder.

In embodiments, the mixture of ionic and electronic conductors may include one or more of a sulfide-based electrolyte, an oxide-based electrolyte, a hydride-based electrolyte, a halide-based electrolyte, a borate-based electrolyte, a phosphate-based electrolyte, a thin film, a polymer-based electrolyte, a carbon-based material, and metallic-based materials.

In embodiments, the polymer-based electrolyte may include one or more of a polymer, polyethylene oxide (PEO), polyethylene sulfide (PES), polyphenylene oxide (PPO) and polyacrylonitrile (PAN), polystyrene (PS), polymethacrylates (PMA), poly(ethylene glycol-methyl methacrylate)(PEG-MMA), poly(vinyl alcohol) (PVA) and salt of lithium bis(trifluoromethanesulfonyl)imide (LiTFSI), lithium bis(fluorosulfonyl)amide (LiFSI), lithium hexafluorophosphate (LiPF6), lithium tetrafluoroborate (LiBF4), and lithium perchlorate (LiClO4).

In embodiments, the pure ionic conductor may include one or more of a sulfide-based electrolyte, an oxide-based electrolyte, a hydride-based electrolyte, a halide-based electrolyte, a borate-based electrolyte, a phosphate-based electrolyte, a thin film, and a polymer-based electrolyte.

In embodiments, the polymer-based electrolyte may include one or more of a polymer, polyethylene oxide (PEO), polyethylene sulfide (PES), polyphenylene oxide (PPO) and polyacrylonitrile (PAN), polystyrene (PS), polymethacrylates (PMA), poly(ethylene glycol-methyl methacrylate)(PEG-MMA), poly(vinyl alcohol) (PVA) and salt of lithium bis(trifluoromethanesulfonyl)imide (LiTFSI), lithium bis(fluorosulfonyl)amide (LiFSI), lithium hexafluorophosphate (LiPF6), lithium tetrafluoroborate (LiBF4), and lithium perchlorate (LiClO4).

In embodiments, at least one of the first metal electrode and the second metal electrode comprise Li. The pure ionic conductor may include Li3PS4/S/PES@Kevlar. The first mixed conductor may include PEO/LiTFSI/CNTs.

Additional aspects of the present disclosure relate to a solid-state battery. The solid-state battery may include a first metal electrode. The solid-state battery may also include a first mixed conductor disposed on the metal electrode. The first mixed conductor may include a mixture of ionic and electronic conductors. The solid-state battery may include a pure ionic conductor disposed on the first mixed conductor. The solid-state battery may also include a second mixed conductor disposed on the pure ionic conductor. The second mixed conductor may include a mixture of ionic and electronic conductors. The solid-state battery may include a second metal electrode disposed on top of the second mixed conductor.

In embodiments, the first metal electrode may include one or more of Li, a metallic foil, and a metallic powder.

In embodiments, the mixture of ionic and electronic conductors may include one or more of a sulfide-based electrolyte, an oxide-based electrolyte, a hydride-based electrolyte, a halide-based electrolyte, a borate-based electrolyte, a phosphate-based electrolyte, a thin film, a polymer-based electrolyte, a carbon-based material, and metallic-based materials.

In embodiments, the pure ionic conductor may include one or more of a sulfide-based electrolyte, an oxide-based electrolyte, a hydride-based electrolyte, a halide-based electrolyte, a borate-based electrolyte, a phosphate-based electrolyte, a thin film, and a polymer-based electrolyte.

In embodiments, at least one of the first metal electrode and the second metal electrode comprise Li. The pure ionic conductor may include Li3PS4/S/PES@Kevlar. At least one of the first mixed conductor and the second mixed conductor may include PEO/LiTFSI/CNTs.

Additional aspects of the present disclosure relate to a solid-state battery. The solid-state battery may include a first metal electrode. The solid-state battery may also include a first mixed conductor disposed on the metal electrode. The first mixed conductor may include a mix-conductor. The solid-state battery may include a pure ionic conductor disposed on the first mixed conductor. The solid-state battery may further include a second mixed conductor disposed on the pure ionic conductor. The second mixed conductor may include a mixture of ionic and electronic conductors. The solid-state battery may also include a second metal electrode disposed on top of the second mixed conductor.

In embodiments, second mixed conductor may include a mixture of ionic and electronic conductors.

In embodiments, the second mixed conductor may include a mix-conductor.

In embodiments, the first metal electrode may include one or more of Li, a metallic foil, and a metallic powder.

In embodiments, the mix-conductor may include one or more of a Li-M-O structure and a Li-M-S structure.

In embodiments, the second mixed conductor may include a liquid electrolyte.

In embodiments, the liquid electrolyte may include one or more of a carbonate-based electrolyte, ether-based electrolyte, ester-based electrolyte or a mixture of the above.

In embodiments, the mixture of ionic and electronic conductors may include one or more of a sulfide-based electrolyte, an oxide-based electrolyte, a hydride-based electrolyte, a halide-based electrolyte, a borate-based electrolyte, a phosphate-based electrolyte, a thin film, a polymer-based electrolyte, a carbon-based material, and metallic-based materials.

In embodiments, the pure ionic conductor may include one or more of a sulfide-based electrolyte, an oxide-based electrolyte, a hydride-based electrolyte, a halide-based electrolyte, a borate-based electrolyte, a phosphate-based electrolyte, a thin film, and a polymer-based electrolyte.

In embodiments, at least one of the first metal electrode and the second metal electrode may include Li. The pure ionic conductor may include Li3PS4/S/PES@Kevlar. At least one of the first mixed conductor and the second mixed conductor may include PEO/LiTFSI/CNTs.

BRIEF DESCRIPTION OF THE DRAWINGS

Various embodiments are disclosed herein and described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the presently disclosed technology to the precise form disclosed. It should be understood that the presently disclosed technology can be practiced with modification and alteration, and that the disclosed technology be limited only by the claims and the equivalents thereof.

DETAILED DESCRIPTION

Disclosed is a solid-state battery with a mixed heterostructure, embodiments of which can be implemented to improve diffusions and transfer. In various embodiments, the heterostructure may include a sandwiched ionic-mixed—electronic heterostructure. In embodiments, the heterostructure may include a stacking ionic conductor, a mixed ionic and electronic conductor, and an electronic conductor. In some embodiments, the heterostructure may be coupled with an electrode to construct a solid-state metal battery.

Figure 1:
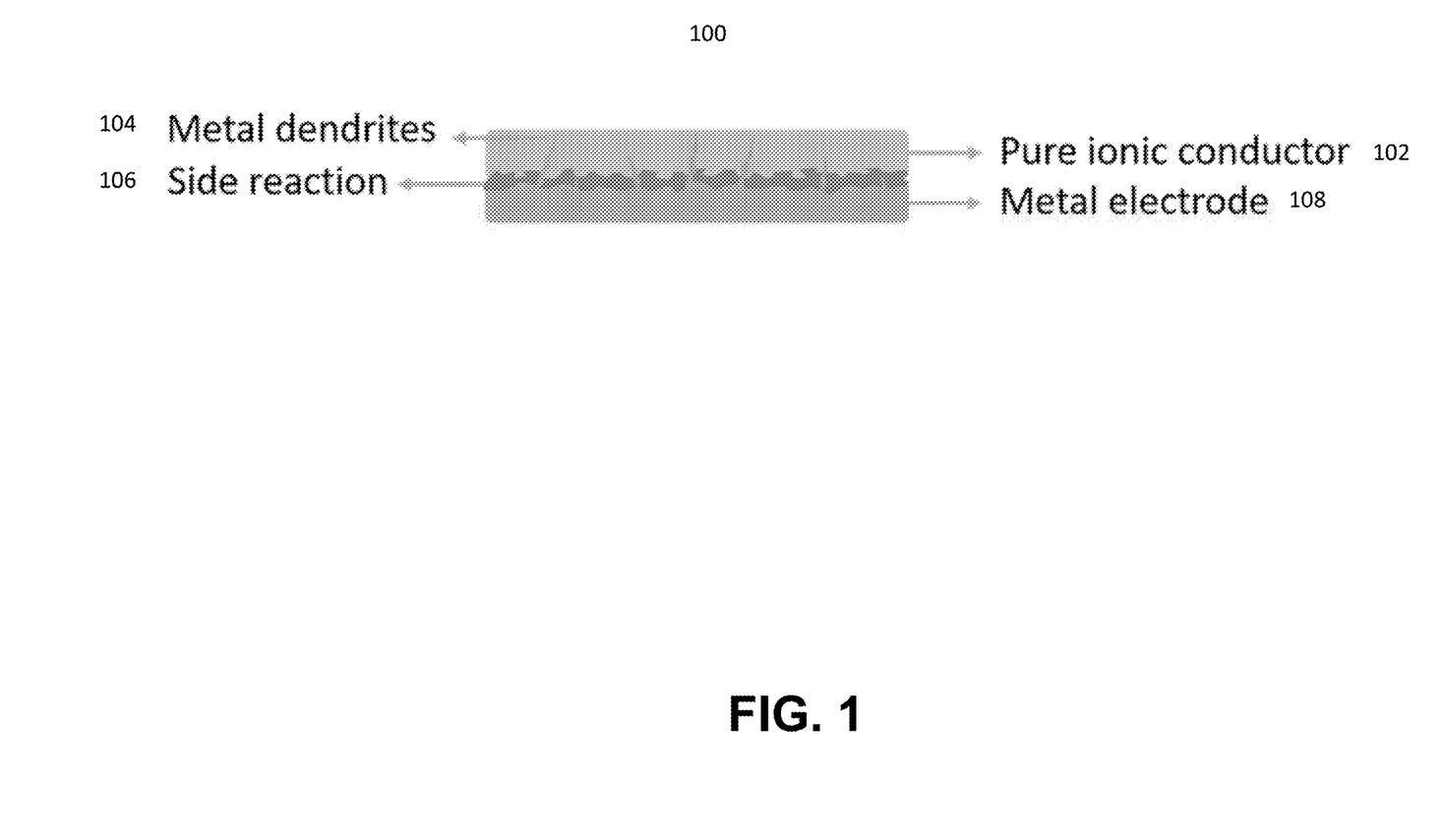
FIG. 1 illustrates an example of a solid-state battery.

FIG. 1 illustrates an example of a solid-state battery. For some existing batteries, a solid-electrolyte electrode 102 may be used, such as an ionic-electronic dual-layer 100. The solid-electrolyte electrode 102 may be directly in contact with the metal electrode 108, resulting in severe (electro) chemical reactions 106 between the two electrodes 102, 108. The interfacial resistance is large and the cell polarization is high. Metal deposits between the solid-electrolyte electrode 102 and the metal electrode 108 electrochemically create metal dendrites 104. The metal dendrites 104 can penetrate through the whole solid-electrolyte electrode 102, short the cell, and cause other safety hazards. The example dual layer 100 in the solid-state battery has a low working current density, and the maximum current density may be about 1 mA/cm$^2$.

Figure 2:
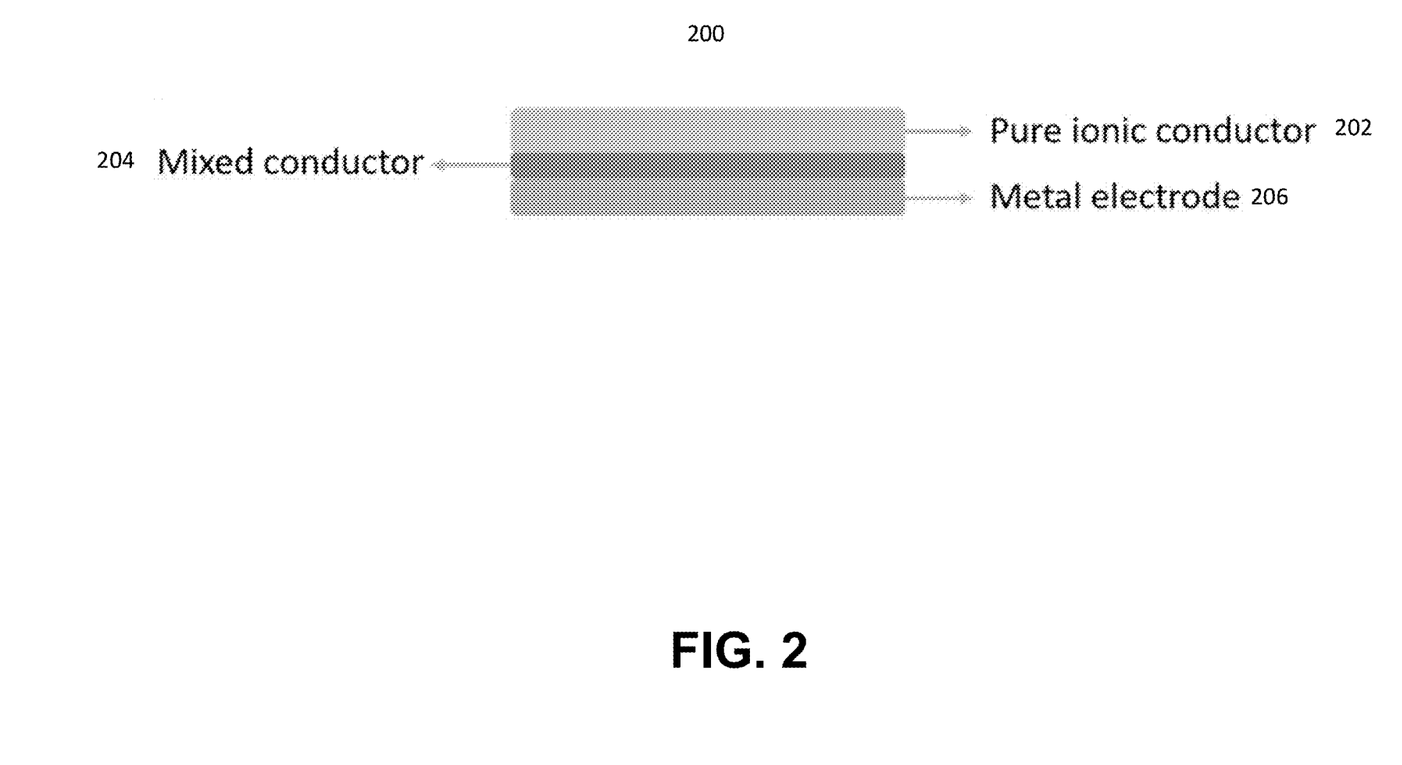
FIG. 2 illustrates an example solid-state battery with a heterostructure, in accordance with various embodiments of the present disclosure.

FIG. 2 illustrates an example solid-state battery with a heterostructure 200, in accordance with various embodiments of the present disclosure. A sandwiched ionic-mixed-electronic heterostructure 200 may allow ions and electrons to diffuse and transfer smoothly across the battery. The sandwiched ionic-mixed-electronic heterostructure 200 may include a stacking ionic conductor 202, a mixed ionic and electronic conductor 204, and an electronic conductor 206. The sandwiched ionic-mixed-electronic heterostructure 200 can be coupled with an electrode to construct a solid-state metal battery. As illustrated, the sandwiched ionic-mixed-electronic heterostructure 200 may include three conductive layers: the pure ionic conductor 202, the mixed conductor 204, and the metal electrode 206. With the sandwiched ionic-mixed-electronic heterostructure 200 in the solid-state metal batteries, (1) the direct contact between the ionic conductor 202 (e.g., solid electrolyte) and electronic conductor 206 (e.g., electrode) may be avoided as well as the corresponding (electro)chemical side reactions; (2) the interfacial resistance may be significantly reduced; (3) the metal deposition may electrochemically grow between the mixed conductor 204 and electronic conductor 206, preventing a cell short and increasing safety of the battery; and (4) the solid-state metal battery can be operated at a high current density (e.g., as high as 10 mA/cm$^2$).

The pure ionic conductor 202 may include one or more sulfide-based solid electrolytes (e.g., xLi2S-yP2S5-zS, xNa2S-yP2S5-zS, etc.), oxide-based electrolytes (e.g., perovskite, NASICON, LISICON, garnet, etc.), hydride-based electrolytes (e.g., LiBH$_4$, Li$_3$AlH$_6$ LiNH$_2$, etc.), halide-based electrolytes (e.g., LiI, spinel Li$_2$ZnI$_4$, anti-perovskite Li$_3$OCl, etc.), borate- or phosphate-based electrolytes (e.g., Li$_2$B$_4$O$_2$, Li$_3$PO$_4$, Li$_2$O—B$_2$O$_3$—P$_2$O$_5$, etc.), thin films (e.g., LiPON), polymer-based electrolytes (e.g., poly(ethylene oxide) (PEO), poly(ethylene sulfide) (PES), etc.), and different combinations, or compositions, of the above materials. It should be appreciated that other materials may be used for the pure ionic conductor 202 in addition to what is described above. In some embodiments, the polymer-based electrolytes may include one or more of a polymer, polyethylene oxide (PEO), polyethylene sulfide (PES), polyphenylene oxide (PPO) and polyacrylonitrile (PAN), polystyrene (PS), polymethacrylates (PMA), poly(ethylene glycol-methyl methacrylate)(PEG-MMA), poly(vinyl alcohol) (PVA) and salt of lithium bis(trifluoromethanesulfonyl)imide (LiTFSI), lithium bis(fluorosulfonyl)amide (LiFSI), lithium hexafluorophosphate (LiPF6), lithium tetrafluoroborate (LiBF4), and lithium perchlorate (LiCO4). It should be appreciated that other materials may be used for the polymer-based electrolytes.

The mixed conductor 204 may include a single component of mix-conductor or a mixture of the ionic and electronic conductors. The ionic conductor component may include one or more of a sulfide-based solid electrolytes (e.g., xLi$_2$S-yP$_2$S$_5$-zS, xNa$_2$S-yP$_2$S$_5$-zS, etc.), oxide based electrolytes (e.g., perovskite, NASICON, LISICON, garnet, etc.), hydride-based electrolytes (e.g., LiBH4, Li$_3$AlH$_6$ LiNH$_2$, etc.), halide-based electrolytes (e.g., LiI, spinel Li$_2$ZnI$_4$, anti-perovskite Li$_3$OCl, etc.), borate- or phosphate-based electrolytes (e.g., Li$_2$B$_4$O$_2$, Li$_3$PO$_4$, Li$_2$O—B$_2$O$_3$—P$_2$O$_5$, etc.), thin films (e.g., LiPON), polymer-based electrolytes (e.g., PEO, PES, etc.) and different combinations, or compositions, of the above materials. The polymer-based electrolyte may be substantially the same as the polymer-based electrolyte described above with respect to the pure ionic conductor 202.

The electronic conductor component may include one or more carbon-based materials and their derivatives (e.g., graphite, hard carbon, graphene, oxidized graphene, reduced oxidized graphene, carbon nanotubes (CNTs), carbon sponges, etc.), metallic based materials (e.g., Cu, Al, Ni, Ti, stainless steel, etc.) and/or other electronic conductors. It should be appreciated that other materials may be used for the mixture of ionic and electronic conductors, in addition to what is described above.

In some embodiments, the mixed conductor 204 may include a liquid electrolyte. In embodiments, the mixed conductor 204 may either contain the liquid electrolyte or not. The liquid electrolyte may include one or more of a carbonate-based electrolyte, ether-based electrolyte, and ester-based electrolyte.

The single component of the mix-conductor may include Li-M-O (e.g., Li$_x$V$_2$O$_5$, Li$_x$TMO$_2$ (TM=Ni, Co, Mn, Al, etc.), Li$_x$TM'O$_3$ (TM'=Mn, Mo, Ti, etc.), Li$_x$TM"PO$_4$ (TM"=Fe, Mn, Co, etc.)), Li-M-S (e.g., Li$_x$TiS$_2$, Li$_x$FeS$_2$, Li$_x$VS$_2$, etc.), and other materials. It should be appreciated that other materials may be used for the mix-conductor, in addition to what is described above.

The metal electrode 206 may include one or more of Li, a metallic foil/powder that may be implemented by sticking to the mixed conductor 204 or by electrochemical plating, and other materials. It should be appreciated that other materials may be used for the metal electrode 206, in addition to what is described above.

While some examples are given using Li, the same configuration can be used with Na, K, Mg, Ca, Fe, Zn, Al, etc.

Figure 3A:
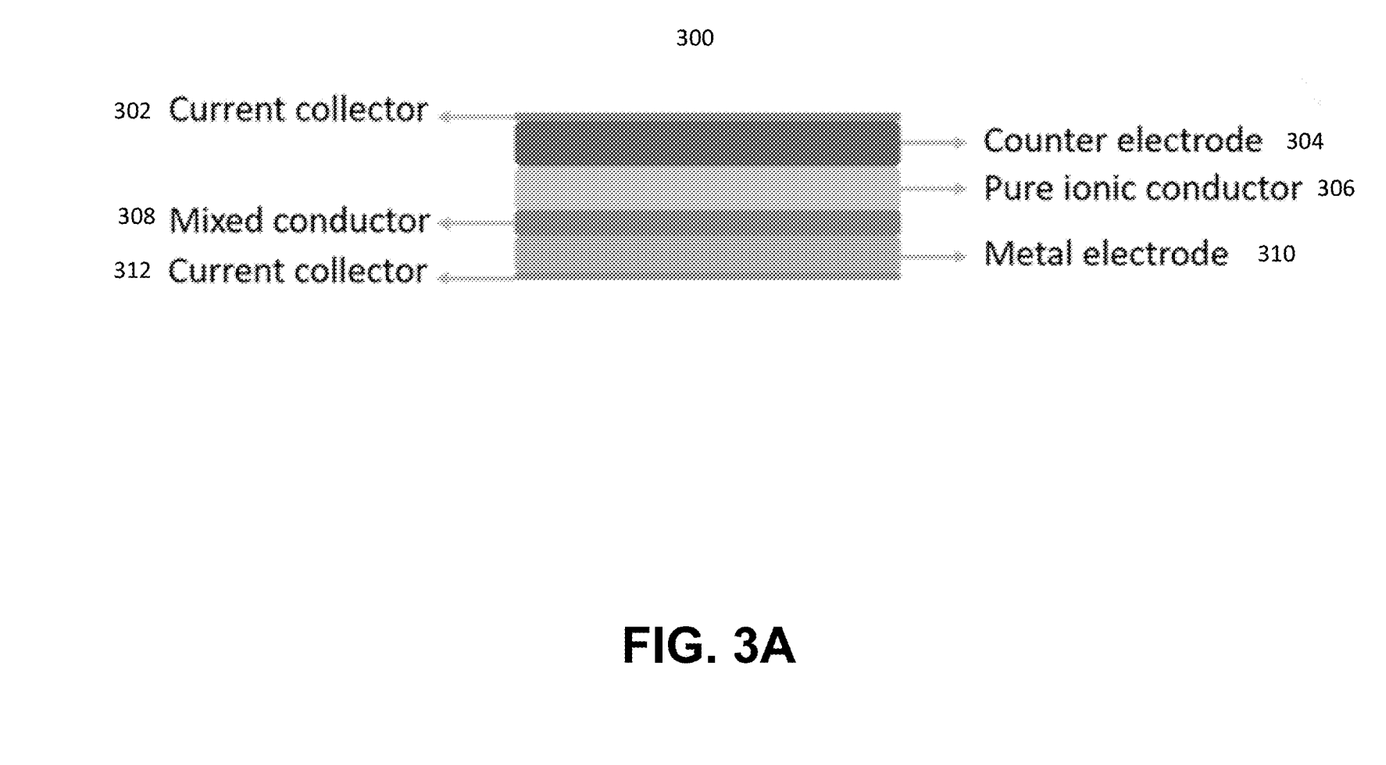
FIG. 3A illustrates an example solid-state battery, in accordance with one embodiment of the present disclosure.

FIG. 3A illustrates an example solid-state battery 300, in accordance with one embodiment of the present disclosure. An all solid-state battery 300 may include a sandwiched ionic-mixed-electronic heterostructure 308 between the pure ionic conductor 306 and the metal electrode 310. In the solid-state battery system, the pure ionic conductor layer 306 may act as a solid electrolyte, which may be the carrier for the ion transport. The mixed conductor 308 may induce the preferential plating of the metal: mainly between the metal electrode 310 and the mixed conductor layer 308. The mixed conductor 308 can effectively block direct contact between the metal 310 and the solid electrolyte 306 (pure ionic conductor). Shorts resulting from metal dendrite growth through the electrolyte can disappear, and the device may be able to operate at a high current density. In addition, the mixed conductor 308 can reduce the interfacial resistance between the electrolyte and the electrode, enabling improved electrochemical performance. A counter electrode 304 may be disposed on the pure ionic conductor, and a current collector 302 may be disposed on the counter electrode 304. The metal electrode 310 may be disposed on another current collector 312.

Figure 3B:
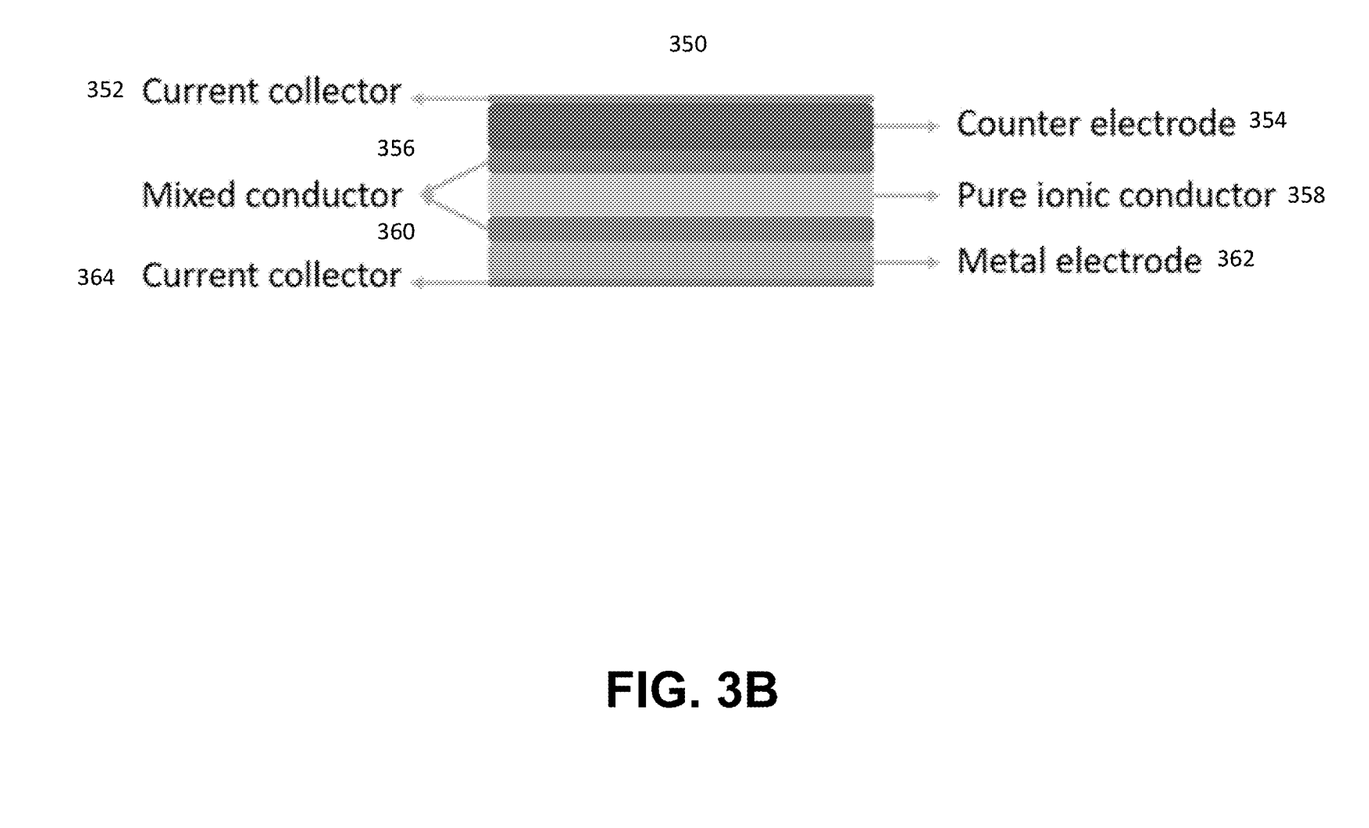
FIG. 3B illustrates an example solid-state battery, in accordance with one embodiment of the present disclosure.

FIG. 3B illustrates an example solid-state battery 350, in accordance with one embodiment of the present disclosure. FIG. 3B may be substantially similar to FIG. 3A as described above, with the addition of a mixed conductor 356 between the counter electrode 354 and the pure ionic conductor 358. The additional mixed conductor layer 356 between the counter electrode 354 and the pure ionic conductor 358 may prevent dendrite growth from the counter electrode 354 into the pure ionic conductor 358, as described above. This may prevent shorts, improve electrochemical performance, and allow the battery to operate at a high current density. In some embodiments, the additional mixed conductor layer 356 may be different from the mixed conductor 360. For example, the additional mixed conductor layer 356 may include a mix-conductor, while the mixed conductor layer 360 may include the mixture of the ionic and electronic conductors, or vice versa. In embodiments, the additional mixed conductor layer 356 and the mixed conductor layer 360 may be the same (e.g., both are a mix-conductor or both are a mixture of the ionic and electronic conductors.

Figure 4:
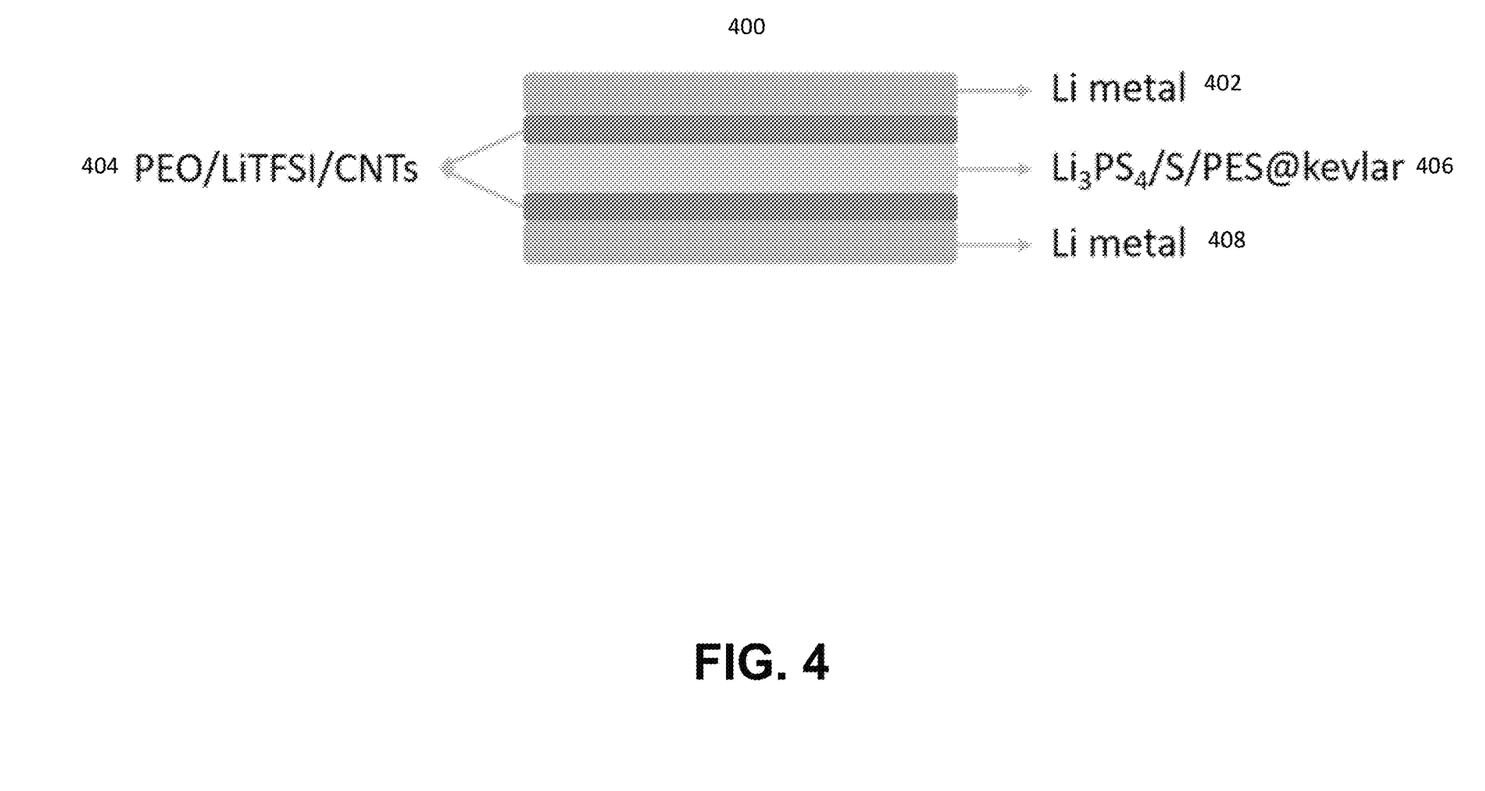
FIG. 4 illustrates an example symmetric all-solid-state cell, in accordance with one embodiment of the present disclosure.

FIG. 4 illustrates an example symmetric all-solid-state cell 400, in accordance with one embodiment of the present disclosure. The symmetric all-solid-state battery 400 may include Li metal as the metal electrode 402, a Li$_3$PS$_4$/S/PES@Kevlar composite as the pure ionic conductor 406, and PEO/LiTFSI/CNTs as the mixed conductor 404 between the metal electrode on top 402 and the pure ionic conductor 406, as well as between the metal electrode on the bottom 408 and the pure ionic conductor 406.

In some embodiments, the pure ionic conductor 406 may be manufactured using a solution process. The solution process may be applied to synthesize the Li$_3$PS$_4$/S/PES composite. The synthesized solution may be dropped onto a Kevlar membrane. After drying and pressing, a freestanding pure ionic conductor 406 may be obtained with a thickness of about 60 μm. The mixed conductor 404 may be fabricated using a similar solution method. The thickness of the mixed conductor 404 can be controlled to about 10 μm by casting the mixed conductor 404 onto a PTFE substrate. The Li metal foil may be pressed on the mixed conductor layer 404 directly.

Figure 5:
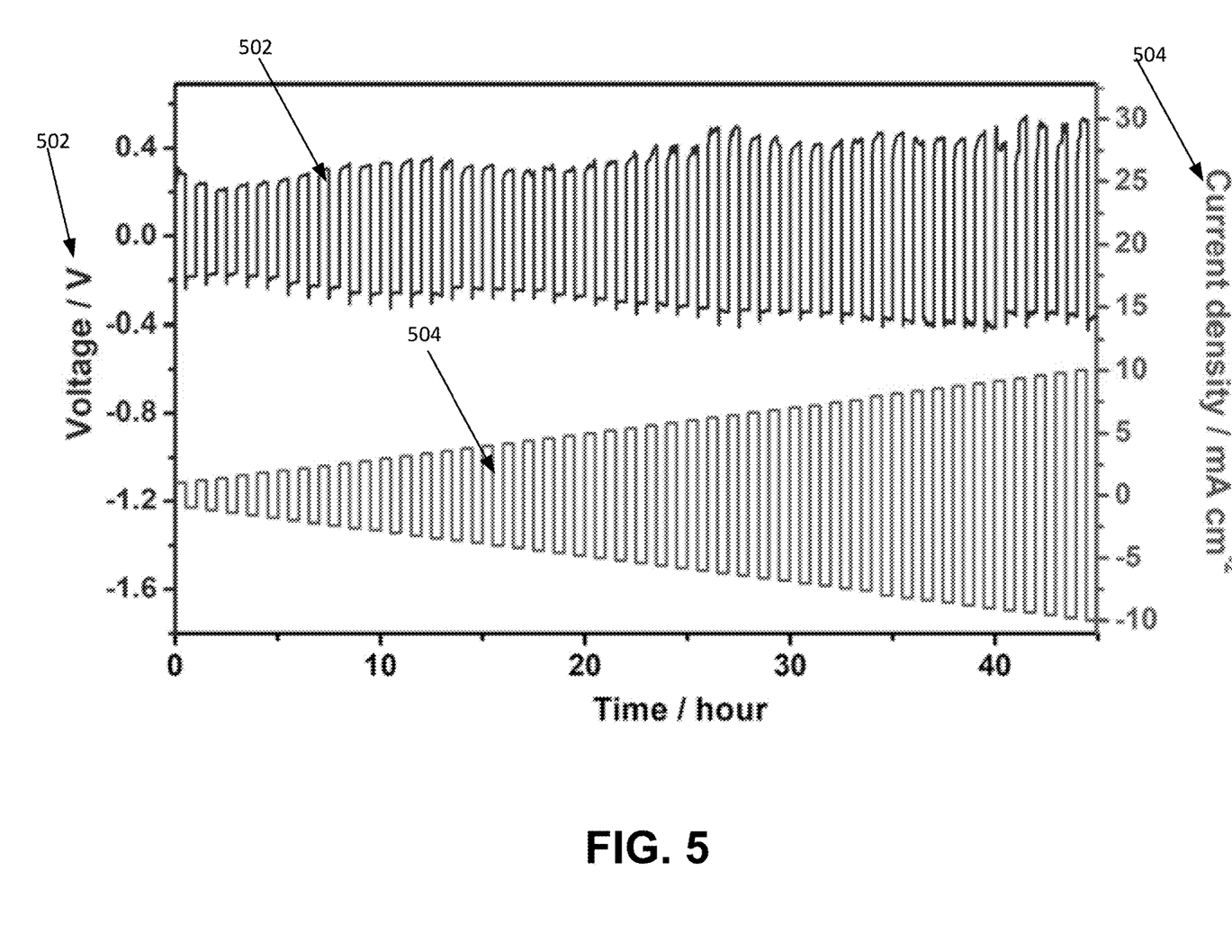
FIG. 5 illustrates a critical current density test for an example cell, in accordance with one embodiment of the present disclosure.

FIG. 5 illustrates a critical current density test for an example cell, in accordance with one embodiment of the present disclosure. 502 illustrates voltage values over time and 504 illustrates current density over time. Increasing the current density by 0.2 mA/cm$^2$ for each cycling, the cell works at a current density as high as about 10 mA/cm$^2$.

Figure 6:
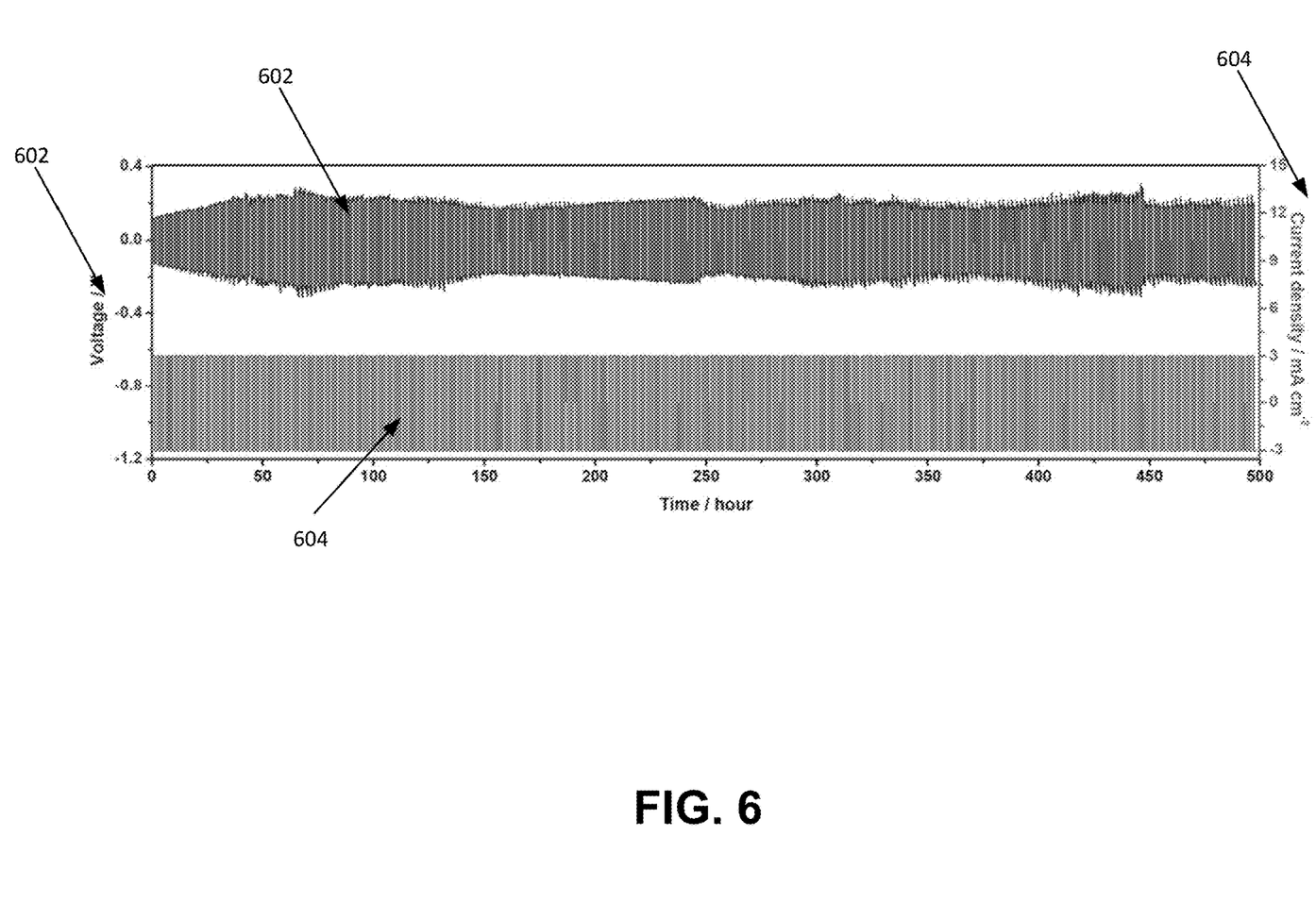
FIG. 6 illustrates a cycling performance of an example cell, in accordance with one embodiment of the present disclosure.

FIG. 6 illustrates a cycling performance of an example cell, in accordance with one embodiment of the present disclosure. 602 illustrates voltage values over time and 604 illustrates current density over time. The graph illustrates a long cycling performance of the symmetric cell at a current density of about 3 mA/cm$^2$ for about 1 hour during plating and stripping. The sandwiched ionic-mixed-electronic heterostructure based solid-state battery illustrates superior electrochemical performance compared with the state-of-the-art conventional solid-state batteries. As illustrated, the cell is able to run for more than 500 hours without any short problems.

Figure 7:
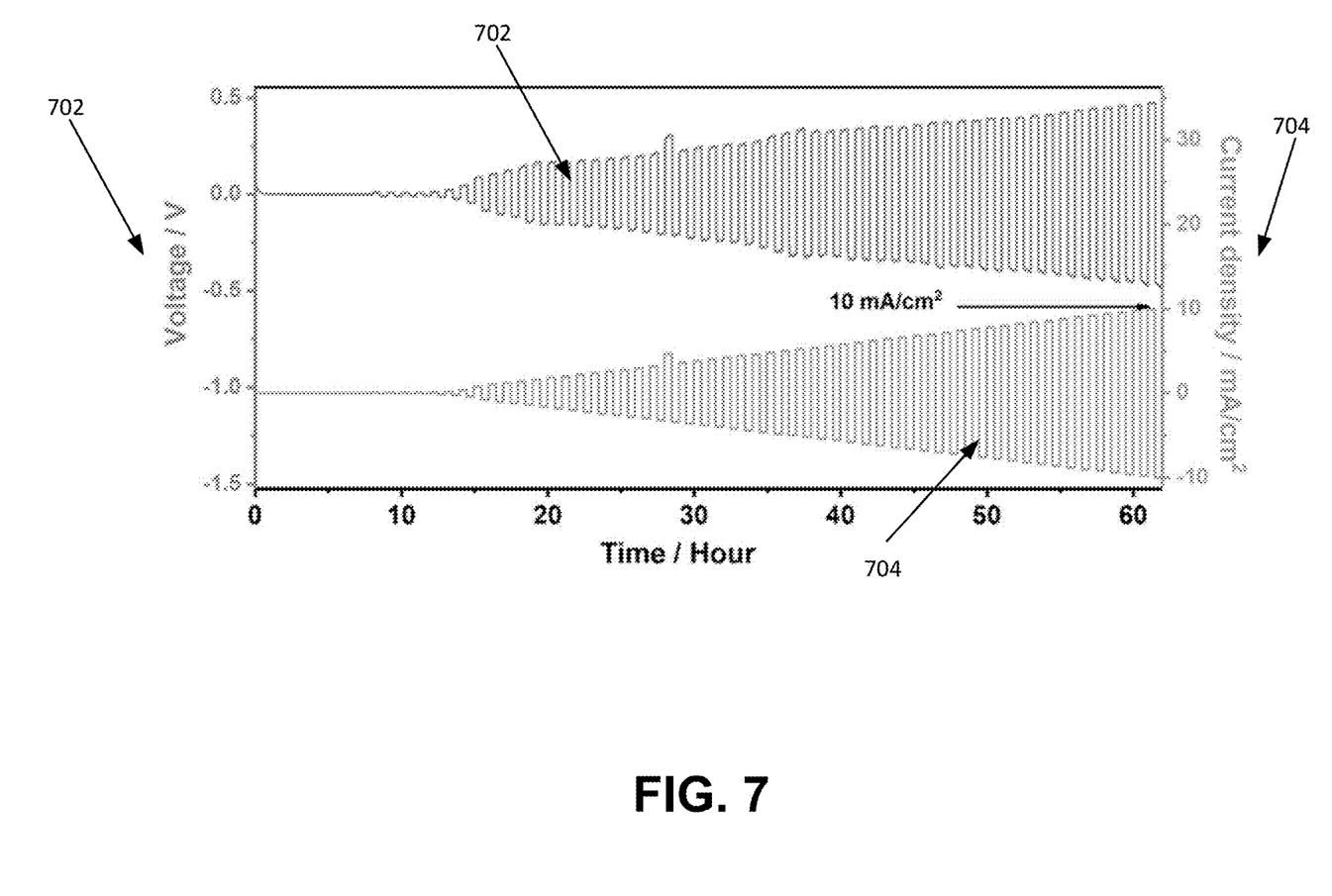
FIG. 7 illustrates a critical current density test for an example cell, in accordance with one embodiment of the present disclosure.

FIG. 7 illustrates a critical current density test for an example cell, in accordance with one embodiment of the present disclosure. 702 illustrates voltage values over time, and 704 illustrates current density over time. Increasing the current density by 0.2 mA/cm$^2$ for each cycling, the cell works at a current density as high as about 10 mA/cm$^2$. As illustrated, the cell is able to run up to an extremely high current density.

Tremendous efforts have been devoted to developing high-energy all-solid-state-batteries with enhanced safety. The presently disclosed technology could mitigate cell short problems, reduce interfacial side-reactions and resistance between the electrolyte and the electrode, and lead to a high-performance solid-state battery. The presently disclosed technology can be scaled for production for future high-energy-density storage systems.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. It will be apparent to one of skill in the art how alternative functional, logical or physical partitioning and configurations can be implemented to implement the desired features of the technology disclosed herein. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A solid-state battery comprising:
   a first metal electrode;
   a first mixed conductor disposed on the first metal electrode, wherein the first mixed conductor comprises a mixture of ionic and electronic conductors;
   a pure ionic conductor disposed on the first mixed conductor; and
   a second metal electrode disposed on top of the pure ionic conductor.

2. The solid-state battery of claim 1, further comprising a second mixed conductor disposed between the pure ionic conductor and the second metal electrode, wherein the second mixed conductor comprises the mixture of ionic and electronic conductors.

3. The solid-state battery of claim 1, wherein the first metal electrode and the second metal electrode comprise one or more of Li, a metallic foil, and a metallic powder.

4. The solid-state battery of claim 1, wherein the mixture of ionic and electronic conductors comprises one or more of a sulfide-based electrolyte, an oxide-based electrolyte, a hydride-based electrolyte, a halide-based electrolyte, a borate-based electrolyte, a phosphate-based electrolyte, a thin film, a polymer-based electrolyte, a carbon-based material, and metallic-based materials.

5. The solid-state battery of claim 4, wherein the polymer-based electrolyte comprises one or more of a polymer, polyethylene oxide (PEO), polyethylene sulfide (PES), polyphenylene oxide (PPO) and polyacrylonitrile (PAN), polystyrene (PS), polymethacrylates (PMA), poly(ethylene glycol-methyl methacrylate)(PEG-MMA), poly(vinyl alcohol) (PVA) and salt of lithium bis(trifluoromethanesulfonyl)imide (LiTFSI), lithium bis(fluorosulfonyl)amide (LiFSI), lithium hexafluorophosphate (LiPF6), lithium tetrafluoroborate (LiBF4), and lithium perchlorate (LiClO4).

6. The solid-state battery of claim 1, wherein the pure ionic conductor comprises one or more of a sulfide-based electrolyte, an oxide-based electrolyte, a hydride-based electrolyte, a halide-based electrolyte, a borate-based electrolyte, a phosphate-based electrolyte, a thin film, and a polymer-based electrolyte.

7. The solid-state battery of claim 6, wherein the polymer-based electrolyte comprises one or more of a polymer, polyethylene oxide (PEO), polyethylene sulfide (PES), polyphenylene oxide (PPO) and polyacrylonitrile (PAN), polystyrene (PS), polymethacrylates (PMA), poly(ethylene glycol-methyl methacrylate)(PEG-MMA), poly(vinyl alcohol) (PVA) and salt of lithium bis(trifluoromethanesulfonyl)imide (LiTFSI), lithium bis(fluorosulfonyl)amide (LiFSI), lithium hexafluorophosphate (LiPF6), lithium tetrafluoroborate (LiBF4), and lithium perchlorate (LiClO4).

8. The solid-state battery of claim 1, wherein the first metal electrode and the second metal electrode comprise Li, wherein the pure ionic conductor comprises $Li_3PS_4$/S/PES@Kevlar, and wherein the first mixed conductor comprises PEO/LiTFSI/CNTs.

9. A solid-state battery comprising:
a first metal electrode;
a first mixed conductor disposed on the first metal electrode, wherein the first mixed conductor comprises a mixture of ionic and electronic conductors;
a pure ionic conductor disposed on the first mixed conductor;
a second mixed conductor disposed on the pure ionic conductor, wherein the second mixed conductor comprises the mixture of ionic and electronic conductors; and
a second metal electrode disposed on top of the second mixed conductor.

10. The solid-state battery of claim 9, wherein the first metal electrode comprises one or more of Li, a metallic foil, and a metallic powder.

11. The solid-state battery of claim 9, wherein the mixture of ionic and electronic conductors comprises one or more of a sulfide-based electrolyte, an oxide-based electrolyte, a hydride-based electrolyte, a halide-based electrolyte, a borate-based electrolyte, a phosphate-based electrolyte, a thin film, a polymer-based electrolyte, a carbon-based material, and metallic-based materials.

12. The solid-state battery of claim 9, wherein the pure ionic conductor comprises one or more of a sulfide-based electrolyte, an oxide-based electrolyte, a hydride-based electrolyte, a halide-based electrolyte, a borate-based electrolyte, a phosphate-based electrolyte, a thin film, and a polymer-based electrolyte.

13. The solid-state battery of claim 9, wherein the first metal electrode and the second metal electrode comprise Li, wherein the pure ionic conductor comprises $Li_3PS_4$/S/PES@Kevlar, and wherein the first mixed conductor and the second mixed conductor comprise PEO/LiTFSI/CNTs.

14. A solid-state battery comprising:
a first metal electrode;
a first mixed conductor disposed on the first metal electrode, wherein the first mixed conductor comprises a mix-conductor;
a pure ionic conductor disposed on the first mixed conductor;
a second mixed conductor disposed on the pure ionic conductor; and
a second metal electrode disposed on top of the second mixed conductor.

15. The solid-state battery of claim 14, wherein the second mixed conductor comprises a mixture of ionic and electronic conductors.

16. The solid-state battery of claim 14, wherein the second mixed conductor comprises the mix-conductor.

17. The solid-state battery of claim 16, wherein the mix-conductor comprises one or more of a Li-M-O structure and a Li-M-S structure.

18. The solid-state battery of claim 14, wherein the second mixed conductor comprises a liquid electrolyte.

19. The solid-state battery of claim 18, wherein the liquid electrolyte comprises one or more of a carbonate-based electrolyte, ether-based electrolyte, and ester-based electrolyte.

20. The solid-state battery of claim 14, wherein the first metal electrode comprises one or more of Li, a metallic foil, and a metallic powder.

21. The solid-state battery of claim 15, wherein the mixture of ionic and electronic conductors of the second mixed conductor comprises one or more of a sulfide-based electrolyte, an oxide-based electrolyte, a hydride-based electrolyte, a halide-based electrolyte, a borate-based electrolyte, a phosphate-based electrolyte, a thin film, a polymer-based electrolyte, a carbon-based material, and metallic-based materials.

22. The solid-state battery of claim 14, wherein the pure ionic conductor comprises one or more of a sulfide-based electrolyte, an oxide-based electrolyte, a hydride-based electrolyte, a halide-based electrolyte, a borate-based electrolyte, a phosphate-based electrolyte, a thin film, and a polymer-based electrolyte.

23. The solid-state battery of claim 14, wherein the first metal electrode and the second metal electrode comprise Li, wherein the pure ionic conductor comprises $Li_3PS_4$/S/PES@Kevlar, and wherein the second mixed conductor comprises PEO/LiTFSI/CNTs.

* * * * *